July 23, 1957    F. J. SCHENKELBERGER    2,800,236
SELF-UNLOADING INDUSTRIAL TRUCK
Filed June 30, 1953    9 Sheets-Sheet 1
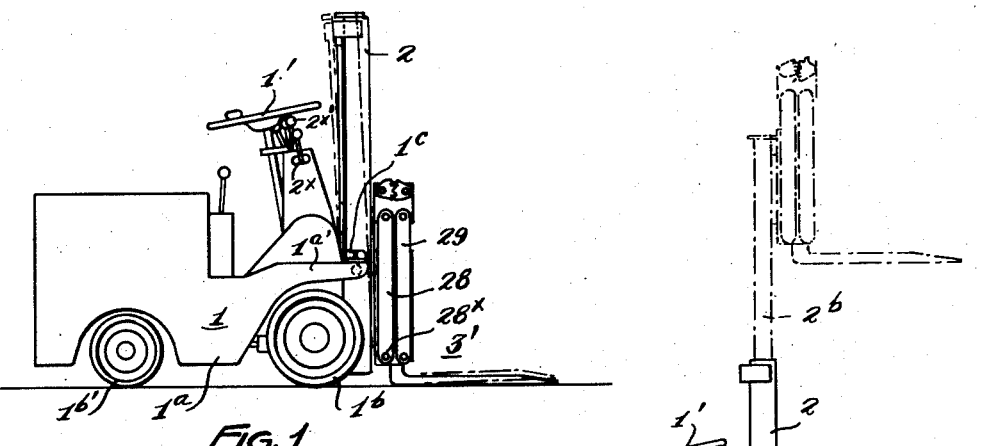
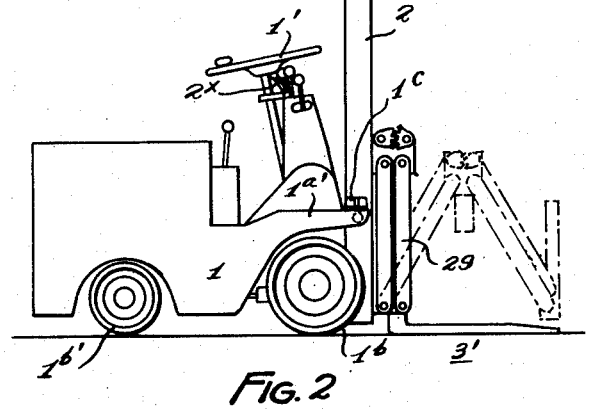
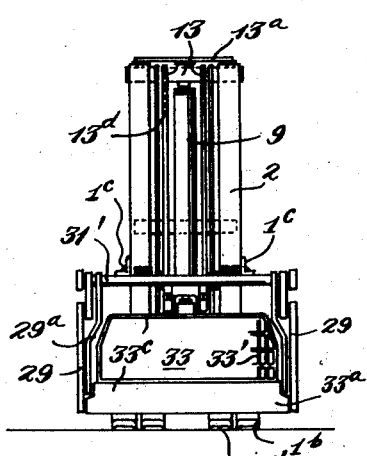
INVENTOR.
FRANK J. SCHENKELBERGER
BY Geo. B. Pitts
ATTORNEY

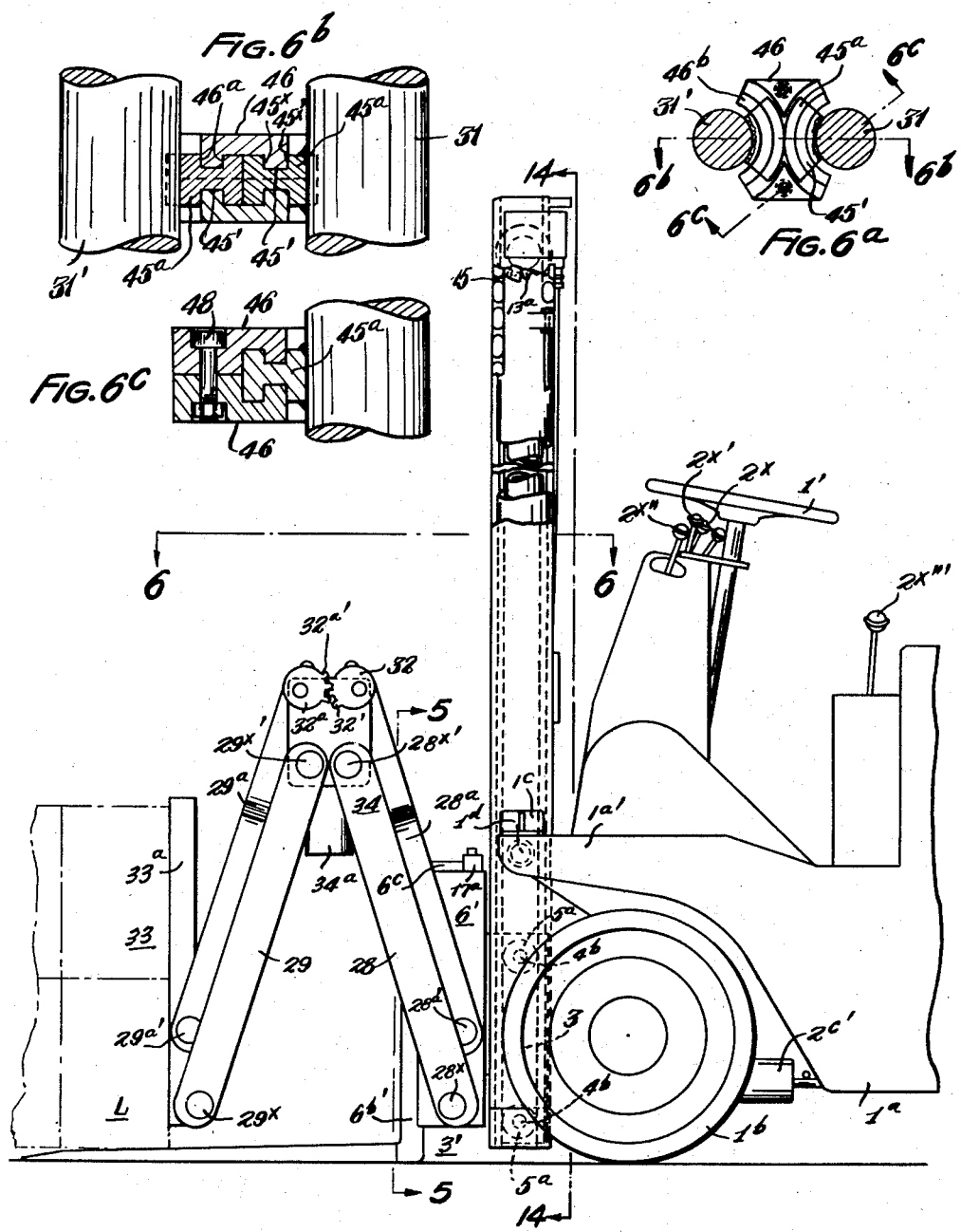

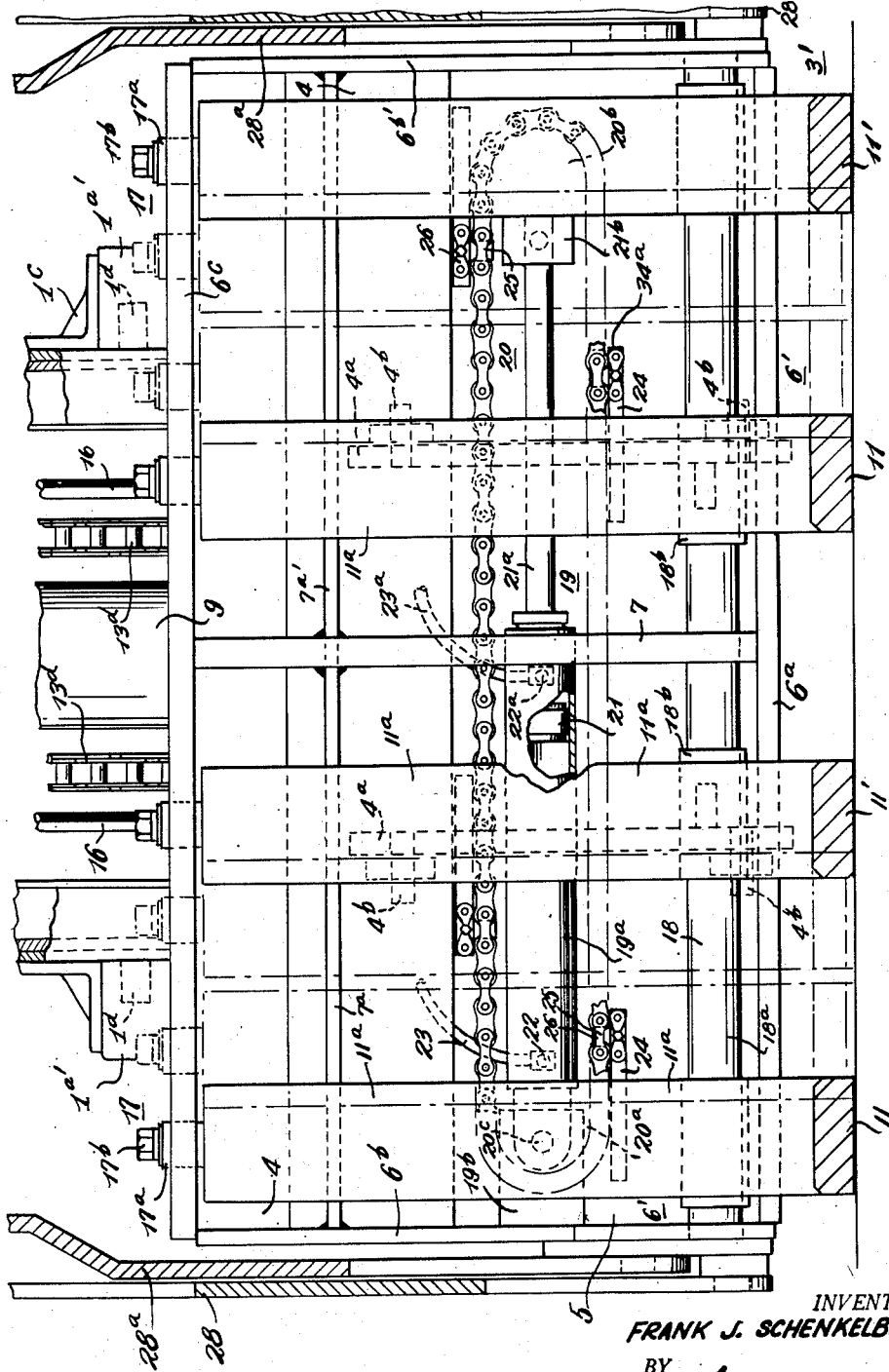

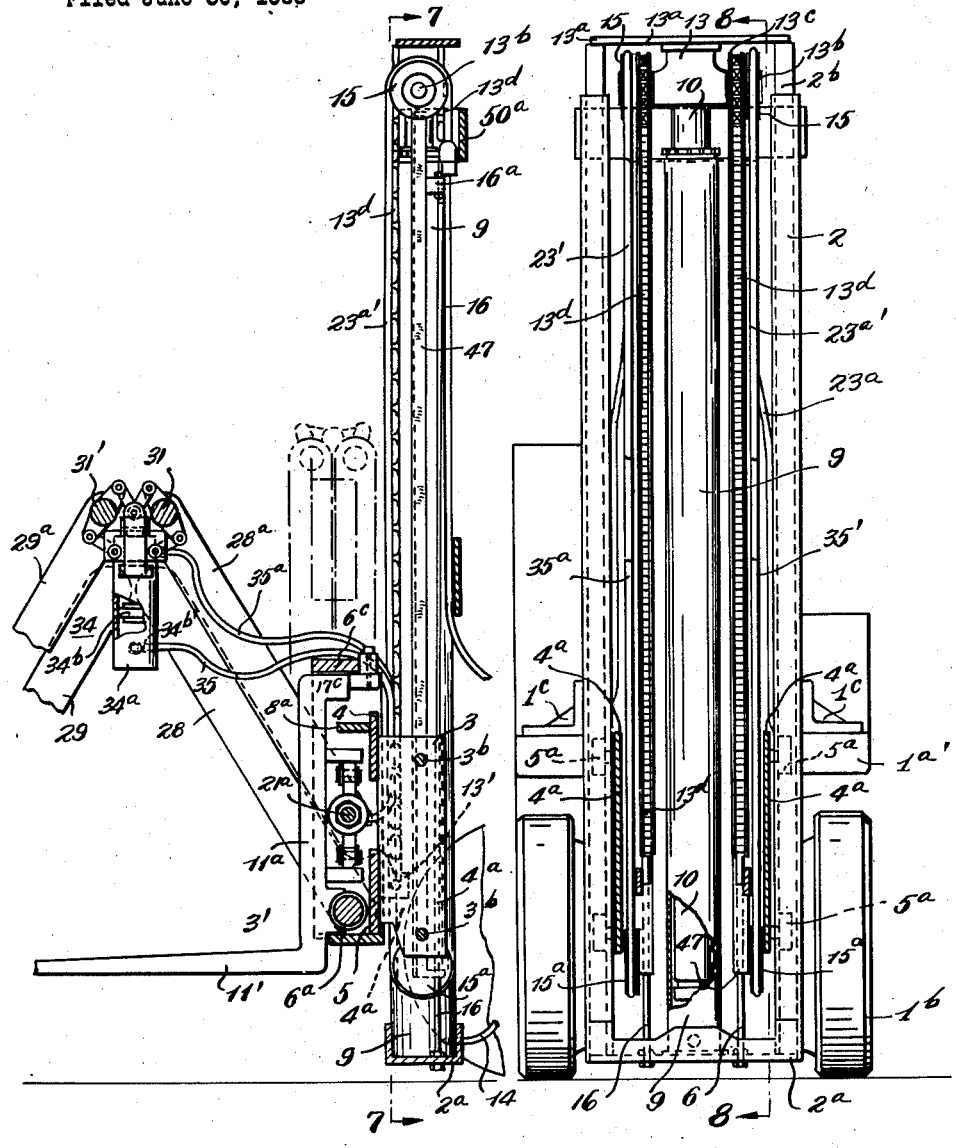

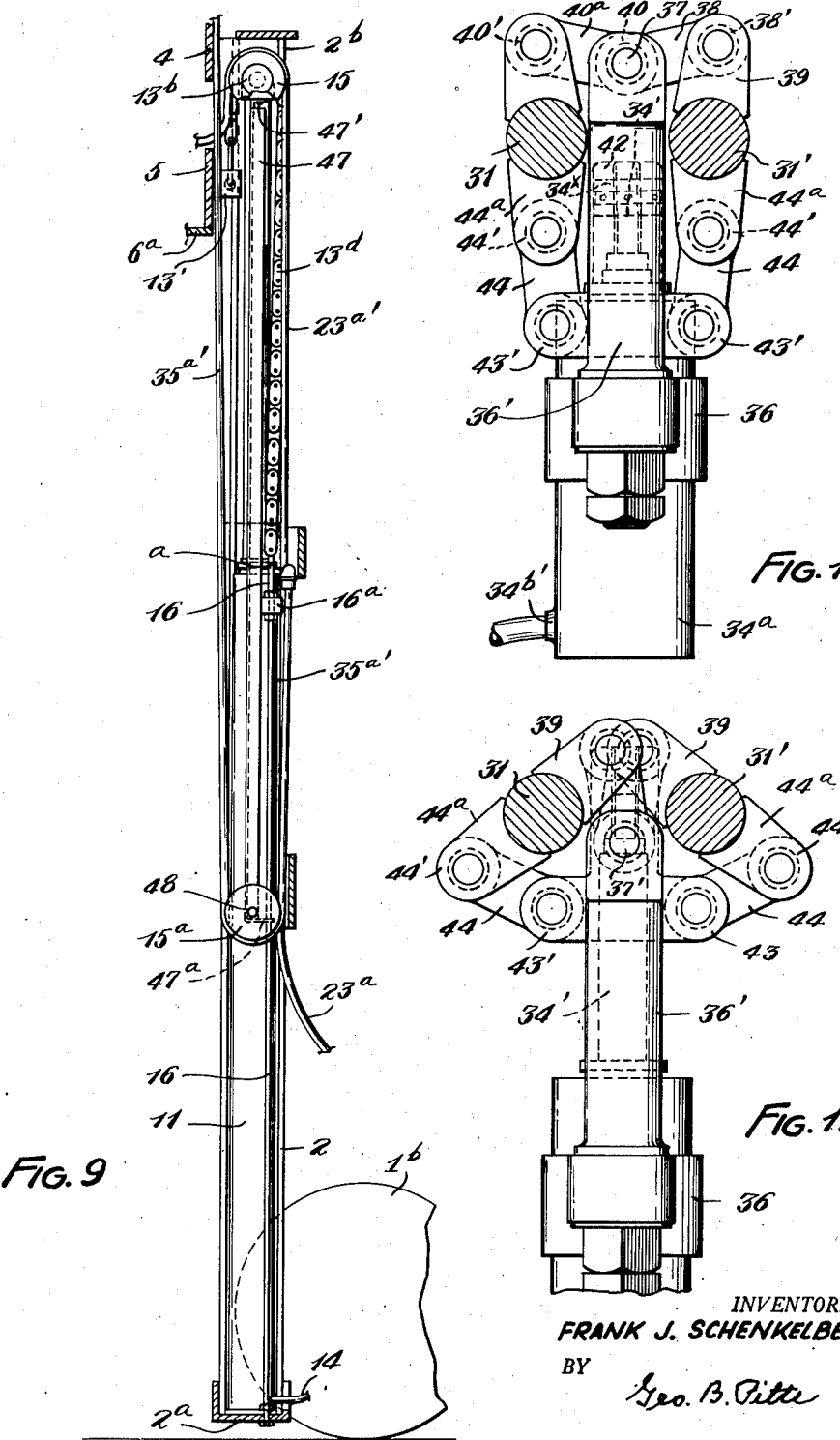

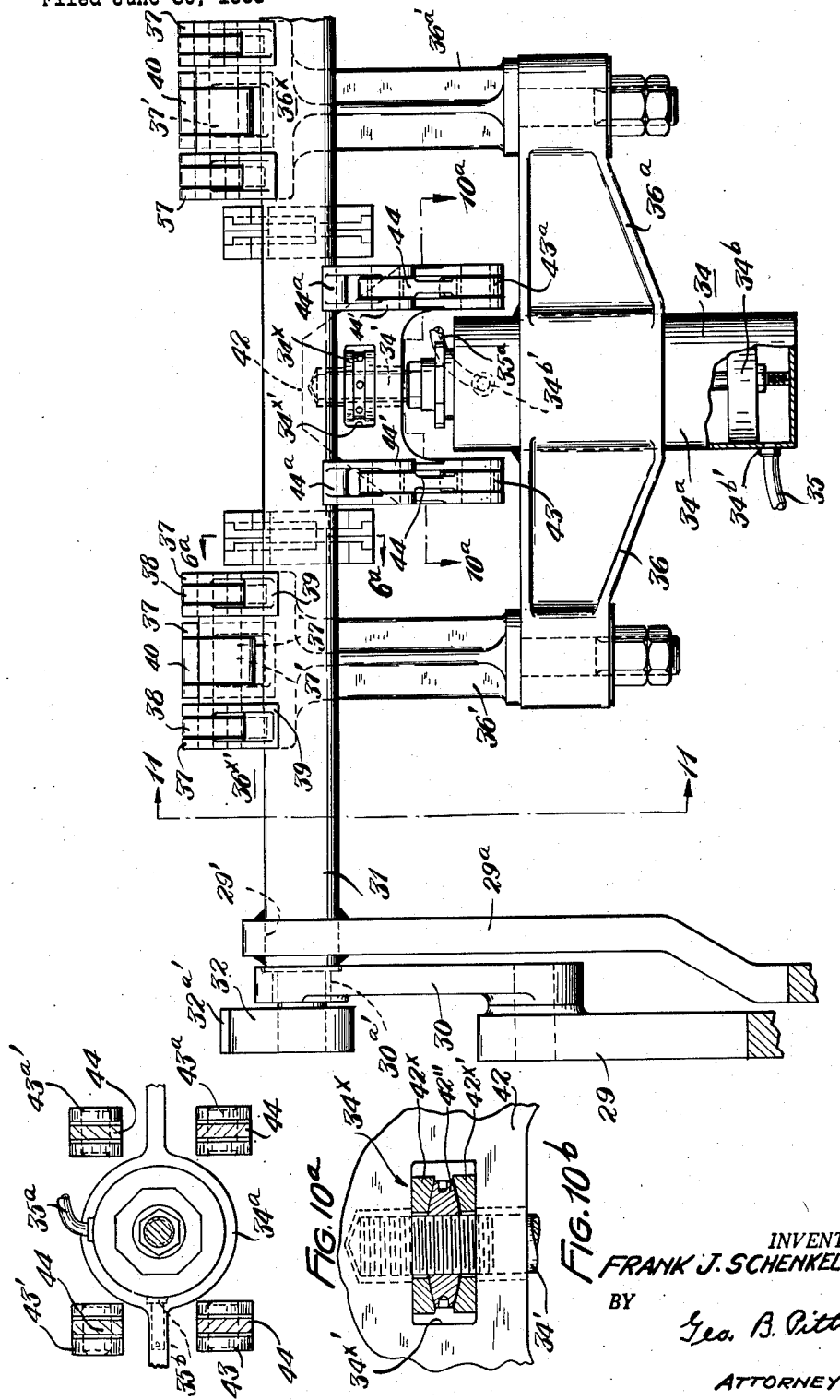

July 23, 1957   F. J. SCHENKELBERGER   2,800,236
SELF-UNLOADING INDUSTRIAL TRUCK
Filed June 30, 1953   9 Sheets-Sheet 8

INVENTOR.
FRANK J. SCHENKELBERGER
BY
Geo. B. Pitts
ATTORNEY

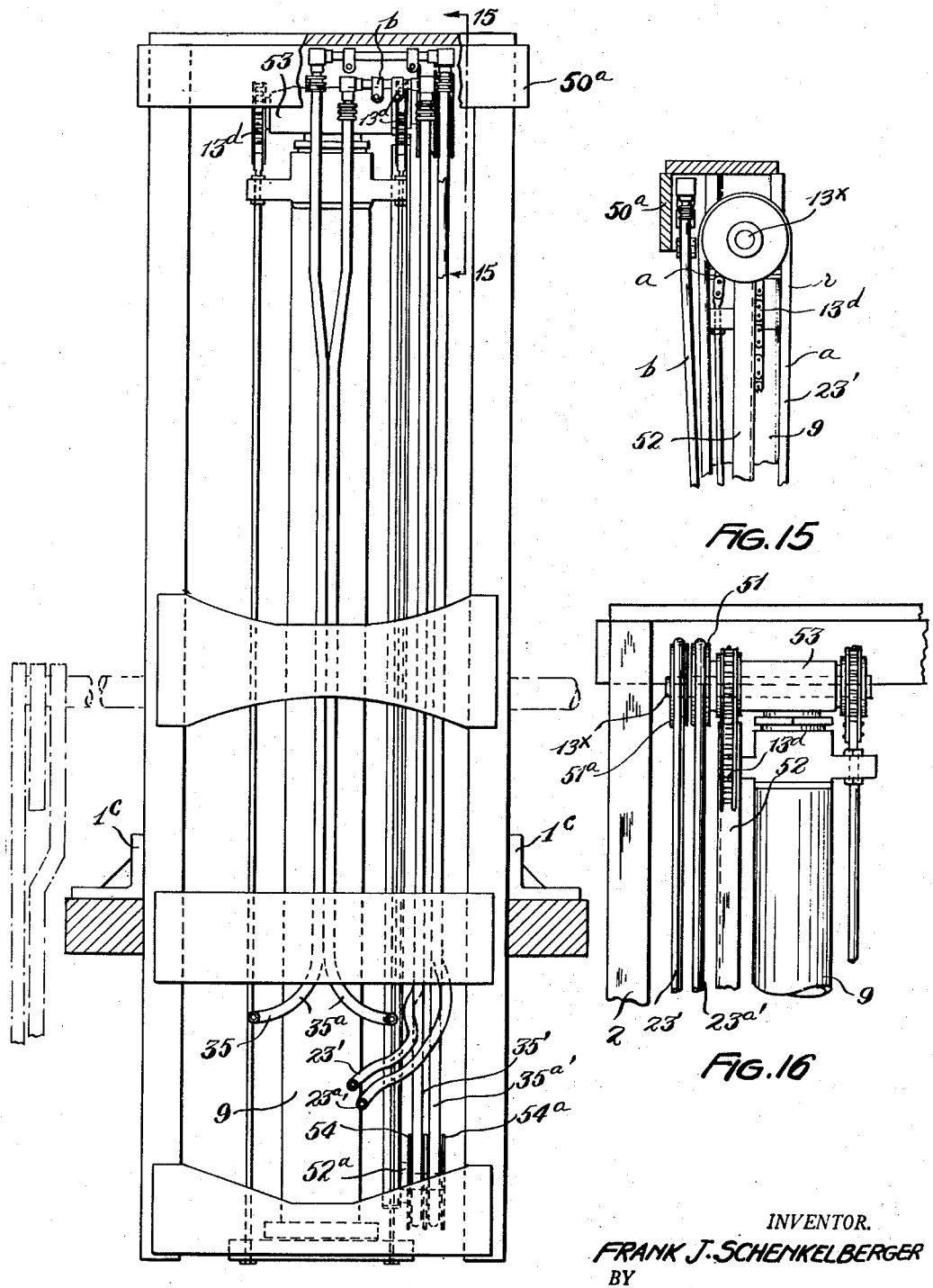

United States Patent Office 2,800,236
Patented July 23, 1957

2,800,236

SELF-UNLOADING INDUSTRIAL TRUCK

Frank J. Schenkelberger, North Olmsted, Ohio, assignor, by mesne assignments, to The Baker-Raulang Company, a corporation of Delaware Application June 30, 1953, Serial No. 365,063

6 Claims. (Cl. 214—514)

This invention relates to an industrial truck of the elevating type in which are incorporated certain improvements in fluid operated mechanisms and fluid connections therefor leading from a single source of fluid pressure supply, mounted on the truck frame.

The disclosure herein includes guide means for a support, (a) which is raised by one of said mechanisms, (b) means for tilting the guide means and parts supported thereon operated by another of said mechanisms, (c) a load engaging and supporting means, movable with the support and operated by another of said mechanisms, and (d) a load discharging mechanism, mounted on the support, and movable relative to the latter and operated by another of said mechanisms, the load engaging and supporting means being operable in various elevated positions of the support to (I) pick up loads of different types and sizes and (II) discharge the loads therefrom.

One object of the invention is to provide in a truck having a raisable support or carrier which supports a fluid operated mechanism, improved means for supporting the fluid supply and discharge conduits connected to the mechanism arranged to compensate for the movement of the carrier upwardly and downwardly.

Another object of the invention is to provide, in a truck having a vertically movable support, fluid operated mechanisms on the latter, a source of fluid under pressure supply and discharge system and conduits leading from said system to each of said mechanisms, improved means for supporting the outer portions of said conduits, whereby said support may be moved to and from selected elevated positions without disassembly of said conduits or cutting off of the fluid flow therethrough.

Another object of the invention is to provide, in a truck having a raisable support, a plurality of fluid operated mechanisms mounted on the latter in associated relation, one mechanism being operable to pick up and transport a load, stack or de-stack the load and the other mechanism being operable to discharge the load independently of the first mentioned mechanism, the mechanisms having a common source of fluid supply and discharge, improved means for supporting the fluid connections leading to and from each of the mechanisms.

Another object of the invention is to provide in a truck having a raisable load support, an improved mechanism associated with the support for discharging loads therefrom.

Another object of the invention is to provide in a truck having a raisable member and a load carrier on the latter, an improved mechanism for removing loads from the carrier consisting of inner pairs of links the outer ends of which are pivotally mounted on the carrier, outer pairs of links the outer ends of which are pivotally connected to a load discharge device, inner and outer transversely disposed rockers to which the inner ends of the inner pairs of links and outer pairs of links are operatively connected respectively, a hydraulic cylinder connected to a fluid pressure system and having a reciprocable piston therein, operating connections between the cylinder and corresponding sides of the rockers and separate operating connections between the piston and corresponding sides of the rockers in diametrical relation to the connections between the cylinder and the rockers.

Another object of the invention is to provide on the raisable load carrier of an industrial truck, improved power operated mechanism for discharging loads from the carrier consisting of swingably connected, transversely disposed, parallel related inner and outer rockers, inner pairs of links between the carrier and the inner rocker, outer pairs of links between the outer rocker and a member for engaging and discharging a load on the carrier and power mechanism connected to the rockers for oscillating them in opposite directions.

Another object of the invention is to provide in a truck a raisable member having a load carrier thereon, improved mechanism for discharging loads from the carrier of simplified construction consisting of a load engaging member, inner and outer pairs of links the outer ends of which are pivotally connected to the carrier and load engaging member, respectively, and fluid operated means consisting of a cylinder and a reciprocatable piston operatively connected to the inner ends of said pairs of links to simultaneously expand them relative to the carrier and each other to move said member outwardly or simultaneously retract the pairs of links.

Another object of the invention is to provide in a truck having a raisable load carrier, improved means for discharging loads from the carrier, consisting of a vertically disposed load engaging device and mechanism for moving the device outwardly and inwardly and maintaining the load engaging device vertically during such movements.

Another object of the invention is to provide in a truck having an elevating member mounted for vertical movement thereon and provided with an outwardly extending load carrier, improved means for discharging loads from said carrier consisting of a support on said member, a vertically disposed load discharging device, spaced front and rear spaced pairs of elements having pivotal connections between their inner ends, the outer ends of the rear pairs of elements being mounted on said support and the outer ends of the front pairs of elements being connected to and supporting said load discharging device and means between said front and rear pairs of elements for swinging them about their connections to move said device outwardly and inwardly relative to the carrier.

Another object of the invention is to provide in a truck having an elevating member mounted for vertical movement thereon and provided with an outwardly extending load carrier, improved means for discharging loads from said carrier consisting of a vertically disposed load discharging device, front and rear spaced pairs of elements, the rear pairs of elements being pivotally mounted on said carrier and the front pairs of elements being connected to said device and power operated connections between the inner ends of said front and rear pairs of elements for swinging them outwardly and inwardly.

A further object of the invention is to provide, in a truck having a raisable load support, an improved fluid operated, load removing mechanism of simplified construction of the multi-leverage type, wherein the speed of the load removing element exceeds that of fluid piston stroke, whereby the load discharge operation may be economically carried out in a short period of time.

Another object of the invention is to provide in an industrial truck having a raisable load carrier, an improved power operated mechanism for discharging loads from the carrier, comprising spaced pairs of inner and outer links the inner ends of which are swingably related and operatively connected to a power means, the inner pairs of links being pivotally supported on said carrier and the outer pairs of links being pivotally connected to a pusher adapted to engage a load on the carrier and discharge it therefrom.

A still further object of the invention is to provide in a truck having an elevating member provided with a load carrier, improved means for discharging loads from the carrier consisting of spaced pairs of inner links the outer ends of which are pivotally mounted on the carrier, spaced pairs of outer links the outer ends of which are pivotally connected to a load engaging and discharge member, articulatable connections between the inner ends of the pairs of links arranged to maintain the respective pairs of links in parallel relation during movement thereof and a single fluid operated mechanism operatively connected to elements of the articulatable connections for simultaneously expanding the inner and outer pairs of links or simultaneously retracting the inner and outer pairs of links.

Other objects of the invention will be apparent to those skilled in the art to which my invention relates from the following description taken in connection with the accompanying drawings, wherein Fig. 1 is a side elevation of a truck (somewhat diagrammatic) embodying my invention, the elevating member and other parts being shown in normal position;

Fig. 2 is a view similar to Fig. 1, but showing, in dotted lines, the support and carrier in elevated position and the load discharge devices in operated position;

Fig. 3 is a front elevation of the truck looking toward the left of Fig. 1;

Fig. 4 is a fragmentary side elevation of the truck (enlarged) showing the load discharge mechanism in a partially operated position, parts being broken away;

Fig. 5 is a fragmentary section on the line 5—5 of Fig. 4, enlarged, parts being broken away;

Fig. 6a is a section on the line 6a—6a of Fig. 10;

Figure 6:
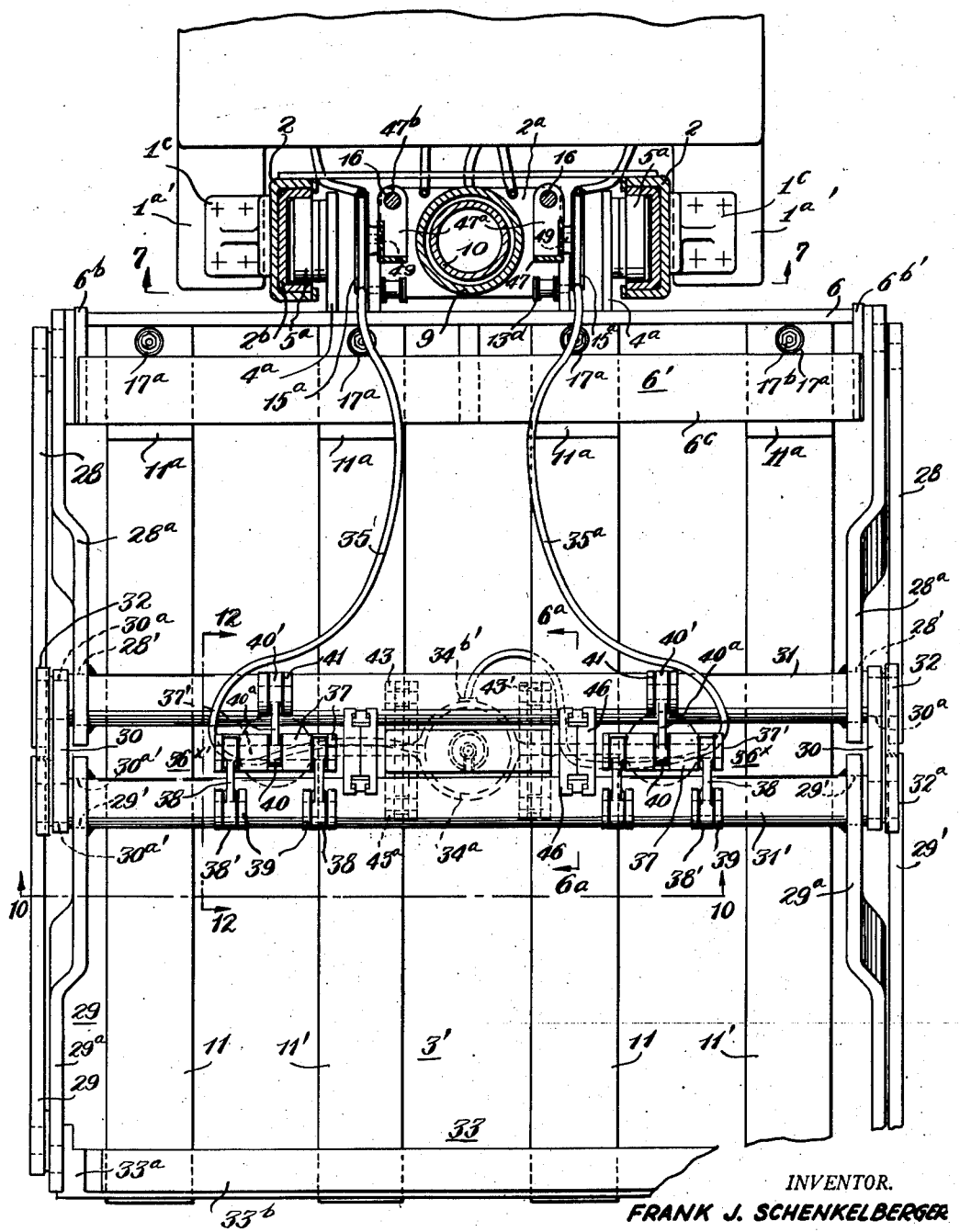
Fig. 6 is a section on the line 6—6 of Fig. 4, enlarged, but with the load pusher in its outward-most position.
Figure 13:
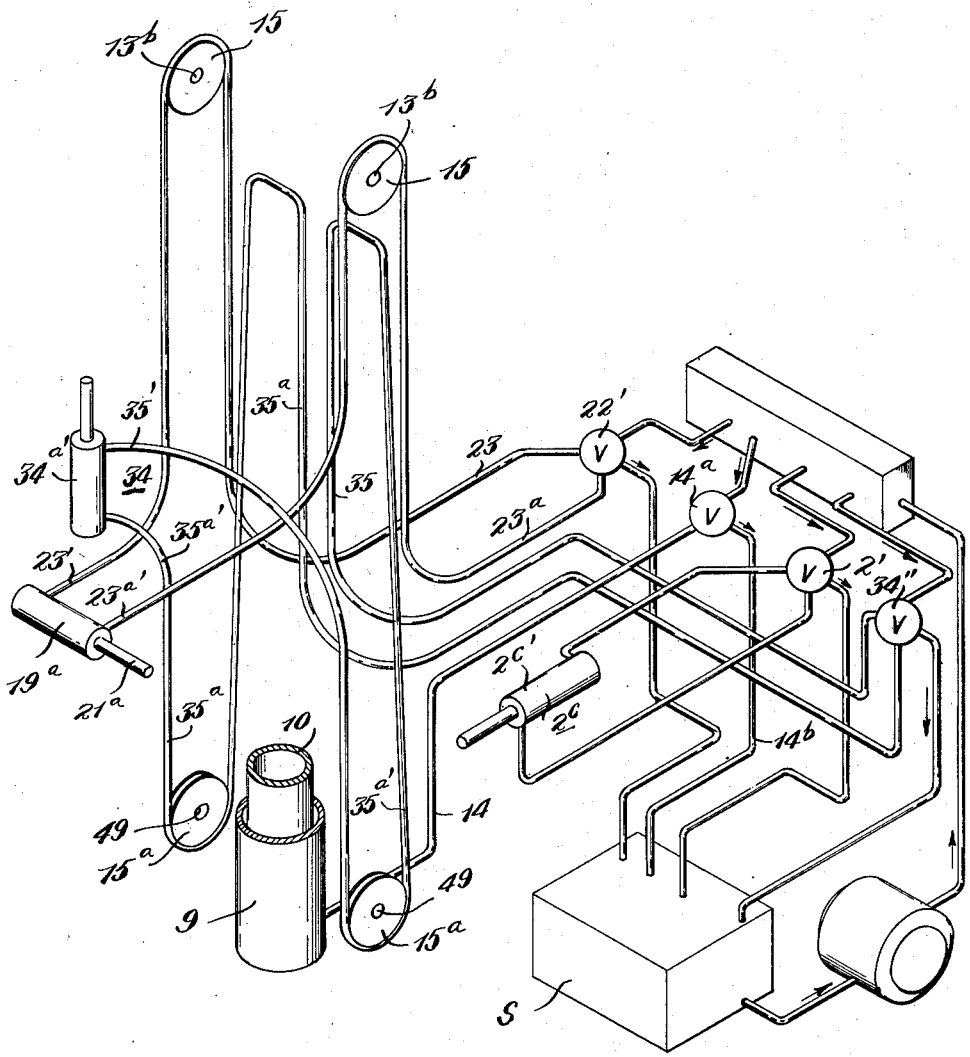

Figs. 6b and 6c are sections (somewhat enlarged) on the lines 6b—6b and 6c—6c, respectively, of Fig. 6a with certain parts thereof shown in elevation;

Fig. 7 is a section on the line 7—7 of Figs. 6 and 8; the elevating mechanism being shown in a partly raised position;

Fig. 8 is a section on the line 8—8 of Figs. 6 and 7;

Fig. 9 is a fragmentary section substantially similar to Fig. 8, but showing the elevating mechanism raised to a higher position;

Fig. 10 is an enlarged fragmentary view of the means for operating the load discharge devices taken approximately on the line 10—10 of Fig. 6, enlarged;

Fig. 10a is a section on the line 10a—10a of Fig. 10;

Fig. 10b is a fragmentary section on the line 10b—10b of Fig. 10, enlarged;

Fig. 11 is a section on the line 11—11 of Fig. 10 but with the parts shown in the relative positions they occupy with the load pusher fully retracted;

Fig. 12 is a sectional view taken approximately along line 12—12 of Fig. 6, but showing the parts in operated position;

Fig. 13 is a diagram of the fluid system;

Fig. 14 is an elevation on the line 14—14 of Fig. 4 (parts being omitted to clarify the illustration) showing a modified form of construction;

Fig. 15 is a fragmentary section on the line 15—15 of Fig. 14; and

Fig. 16 is a fragmentary elevational view looking from the right side of Fig. 15.

In the drawings, 1 indicates as an entirety an industrial truck of the elevating type, whereby loads may be picked up and raised to and from selected levels and transported to a desired location and then discharged at the same or a different level. The truck frame 1a is mounted on pairs of front and rear wheels 1b, 1b', respectively, one of said pairs of wheels being driven by a suitable mechanism (not shown) and the other pair of wheels being steerable through suitable connections (not shown) by a steering device shown as a wheel 1' associated with the driver's control station.

The frame 1a is provided at its front end with spaced extensions 1a' having bearings 1c for trunnions 1d (see Fig. 4), which are secured to and extend laterally from the outer sides of a pair of spaced main guides 2, the latter being connected together at their lower ends by a base 2a, whereby the guides 2 and all parts mounted thereon are supported on the truck frame and are adapted to swing or tilt inwardly and outwardly (see dotted lines in Fig. 1). The guides when tilted inwardly, serve to facilitate transportation of the loads. The guides 2 slidably support secondary guides 2b on which an elevating member or support 3 is slidably mounted. The guides 2 are tilted in either direction by a fluid operated mechanism 2c incorporated in a fluid pressure supply and discharge system shown in Fig. 13. The mechanism 2c consists of two cylinder-piston units 2c' arranged within and adjacent the opposite sides of the frame 1a rearwardly of the guides 2 (one cylinder-piston unit only being shown in Figs. 4 and 13). The pistons of these units are connected by rods to suitable linkages (not shown), which in turn are connected to the guides 2 below the trunnions 1d. The pistons are normally disposed intermediate the opposite ends of the cylinders and as the fluid pressure is arranged to be supplied simultaneously to both cylinders on the same sides of the pistons therein, the guides 2 may be tilted in either direction. A valve 2' (Fig. 13), operated by a lever 2x, controls the supply of fluid pressure to the outer or inner ends of the cylinders and discharge of the fluid from the other ends thereof for return flow of the fluid through the valve to a sump S. The parts of the tilting mechanism may be variously constructed and connected in any suitable manner to the guides; for example, by a single cylinder-piston unit, the piston operating through links connected to the guides 2, as shown in Letters Patent No. 2,598,566 to Max Lehmann.

The elevating member 3 consists of the following: 4, 5 indicate upper and lower cross plates, respectively, preferably providing a rear wall 6 for a frame 6' on which a load carrier, indicated as an entirety at 3', is supported.

The plates 4, 5 are provided with rearwardly extending brackets 4a, each provided adjacent at its upper and lower ends with outwardly extending stud shafts 4b. The shafts 4b support rolls 5a, which engage the side walls of the guides 2b to slidably support the elevating member 3 on the latter, whereby the elevating member 3 may be raised and lowered.

The mechanism for raising the elevating member 3 preferably consists of the following: 9 indicates a cylinder mounted on the base 2a. 10 indicates a piston (preferably hollow) reciprocatably mounted in the cylinder 9 and shown in slightly elevated position (Figs. 7 and 8). The upper end of the piston 10 is provided with a cross head 13 suitably connected to a cross member 13a. As shown in Fig. 7, the cross member 13a is connected to the upper ends of the secondary guides 2b, so that when the piston 10 is operated endwise upwardly it raises the guides 2b relative to the guides 2. The piston 10 is operated upwardly by fluid under pressure (such as oil) supplied by a pipe 14 suitably connected to the lower end of the cylinder 9, the pipe 14 being connected to the fluid system (Fig. 13), as later referred to. Fluid pressure supplied through the pipe to the cylinder 9 is controlled by a valve 14a, which in one position connects the fluid pressure supply to the pipe 14 and in its other position connects the latter to a discharge pipe 14b for flow of the fluid to the sump S, whereby the piston 10 and guides 2b may gravitate downwardly. The valve 14a is operated by a lever 2x'. The cross head 13 is provided at diametrical sides, substantially in the plane of the guides 2, 2b, with outwardly extending shafts 13b on each of which are loosely mounted, in side-by-side relation, a sprocket 13c and a pulley 15 (which is later referred to). The sprockets 13c are engaged by flexible members, such as chains 13d. The chains 13d extend downwardly from the inner sides of the sprockets 13c and are suitably adjustably connected at their inner ends to the upper ends of rods 16, whereas the outer ends of the chains 13c are suitably fixed to a connector 13' provided on the inner side of the plate 5 (see Figs. 8 and 9). In this arrangement, it will be noted that when the piston 10 moves upwardly the guides 2b move therewith, whereas the elevating member 3 moves upwardly at an accelerated speed relative to the guides 2b, whereby the carrier 3' is raised to a selected level. The upper end portions of the rods 16 extend through lugs 16a provided on the cylinder 9 adjacent its upper end, the rods being secured to the lugs by upper and lower nuts. The rods 16 extend downwardly from the lugs 16a for a purpose later set forth, their lower ends being suitably secured to the base 2a.

The frame 6', on which the carrier 3' is mounted, consists of a bottom wall 6a, side walls 6b, 6b', a top wall 6c and spaced upper and lower panels forming the rear wall 6, already referred to. The frame 6' is reinforced vertically by a bar 7 welded to the top and bottom walls thereof and horizontally disposed bars 7a, 7a', each welded at its opposite ends to the vertical bar 7 and one of the side walls 6b, 6b'. The frame 6' may be of any desired width.

The load support or carrier 3' shown herein consists of a plurality of relatively movable, parallelly related elongated members, disposed in a horizontal plane and mounted on and extending outwardly from the frame 6'. In the form of construction shown, the members are related in pairs, two pairs being shown, the members of each pair being designated 11, 11'. As later set forth, the members 11, 11' of each pair are simultaneously operated toward or from each other; whereby the opposite sides of spaced parts of a load may be engaged under pressure, respectively, and raised and then transported as a unit. The inner end of each of the members 11, 11' is provided with an upstanding leg 11a movably mounted on the frame 6'. In the preferred arrangement, such mounting provides for movement of the members of each pair and in the illustrated form of construction it comprises upper and lower guide devices 17, 18, respectively. The devices 18 consist of the following: 18a indicates a guide member disposed adjacent the lower end of the frame 6' and suitably mounted at its opposite ends on the opposed faces of the side bars 6b, 6b'. The inner side of each upstanding leg 11a is welded to an elongated sleeve 18b slidably fitting the guide member 18a, the sleeves on the legs 11a being in axial alinement. The guide devices 17 consist of a roller 17a on each leg 11a, having rolling engagement with the rear side of the top wall 6c. Each roller 17a rotates on a bushing which is mounted on a bolt 17b, between a washer and a bracket 17c. The bracket 17c is fixed to the adjacent leg at the upper end thereof and extends rearwardly therefrom (see Fig. 8). The bolt extends through and has threaded engagement with the walls of an opening formed in the bracket 17c. As will be observed, the guide devices slidably support the members 11a, on the frame 6' in a manner which eliminates binding thereof when relatively moved, as later set forth.

The means for simultaneously operating the load engaging members of each pair toward and from each other comprise a power mechanism 19 preferably fluid operated and a movable device 20 having a detachable connection with each leg 11a. The power mechanism 19 consists of a cylinder-piston unit, the outer end of the cylinder 19a being provided with an extension suitably supported between the inner end portions of a pair of plates 19b, the outer ends of which are suitably secured to the side bar 6b above and spaced from the guide member 18a. The cylinder 19a is provided with a reciprocatable piston 21, which is connected to the inner end portion of a rod 21a. The outer end of the rod is pivotally connected to the inner end of a block 21b, the outer end portion of which is suitably fixed to the rear side of a leg 11a remote from the inner end of the cylinder 19a. The opposite end portions of the cylinder 19a are provided with fluid connections 22, 22a, to which fluid flow pipes 23, 23a, respectively, are connected. The flow pipes 23, 23a are connected to a suitable valve mechanism 22' which is operated by a suitable lever 2x'' on the truck frame. The fluid (such as oil) is supplied under pressure to either pipe 23, 23a, as shown in Fig. 13. By operation of the lever in one direction, the oil under pressure flows through one pipe for supply to the adjacent end of the cylinder 19a to move the piston 21 toward the opposite end thereof, the oil in the cylinder being discharged through the other pipe to and through the valve mechanism to the sump; operation of the lever in the opposite direction reverses the fluid connections to the cylinder 19a to move the piston 21 in the opposite direction. The fluid supply equipment, including the sump, pump, motor for driving the pump and valve mechanisms, is mounted on the truck frame 1a.

The movable device 20 consists of an endless flexible member, preferably a chain, to which the legs 11a are removably connected, as later set forth. The chain 20 reeves about elements 20a, 20b, the element 20a being disposed between the plates 19b and secured thereto by a pin 20c extending through alined openings formed in the plates 19b and element 20a. The element 20b is adjustably mounted on the panel forming the rear wall 6 to take up slack in the flexible member 20, the adjustment means being similar to that shown in my co-pending application Ser. No. 221,638, filed Apr. 18, 1951, now Letters Patent No. 2,663,443, dated Dec. 22, 1953. The connections between the respective legs 11a and the flexible member 20 are similar in construction, so that one only thereof will be referred to as follows: 24 indicates an arm fixed to the rear side of the adjacent leg 11a and extending laterally therefrom toward the adjacent companion leg 11a, in spaced relation to the adjacent run of the flexible member 20. The outer end of each arm 24 is formed with a slot in which a connector 24a is removably seated, that side of the connector adjacent the chain 20 being provided with an extension 25 which fits into the space between adjacent links of the chain 20 to thereby provide a driving connection between the adjacent leg 11a and the adjacent run of the chain. The connector is preferably secured to the arm 24 as follows: the side walls of the slot, which is formed in the arm 24, is formed with a pair of alined through openings and the connector 24a is formed with a pair of through openings which register with the openings in the side walls of the slot. 26 indicates a key consisting of a plate provided with a pair of pins removably extending through the openings in the side walls of the slot and connector, whereby the latter is removably connected to the arm 24. The construction of the connections between the legs 11a and the runs of the chain 20 are substantially similar to that shown in my aforesaid Letters Patent 2,663,443, to which reference may be made. As shown, the legs 11a of the members 11, 11 are connected to one run of the chain 20 (preferably the lower run thereof) and the legs of the members 11', 11' are connected to the other run of the chain 20; accordingly, operation of the piston 21 toward the left—as viewed in Fig. 5—will move the leg 11a, to which the piston rod 21a is connected, in the same direction and the leg in turn will, through the chain, simultaneously move the other legs 11a and effect operation of the members 11, 11', of each pair toward each other, whereby a load may be engaged under pressure and then raised. By operation of the power means 19, the members 11—11', 11—11' may be initially adjustably spaced to accommodate differently sized loads which are to be supported on their upper surfaces.

27 indicates as an entirety a mechanism for discharging loads engaged by or supported on the carrier members 11—11', 11—11'. The mechanism 27 consists of the following: 28, 28a indicate transversely spaced, transversely alined pairs of inner main and supplemental links and 29, 29a indicate spaced, transversely alined pairs of outer main and supplemental links, the inner ends of the pairs of links being articulatably connected together and relatively operated, as later set forth. The main links 28 are pivotally mounted at their outer ends on the outer sides and near the lower ends of the side walls 6b, 6b', of the frame 6' on alined axes 28x and their inner ends are pivotally connected on alined axes 28x' on the outer sides of bridge plates 30, whereas the outer ends of the links 28a are pivotally mounted on the outer sides of the side walls 6b, 6b', of the frame 6' on alined axes 28a' above the pivots 28x for the links 28, and the inner end portion of each link 28a is formed with a through opening 28' through which extends the adjacent end portion of a rocker 31. The links 28a are fixed (preferably welded) to the rocker 31. As shown in Figs. 4 and 6, the opposite end portions of the rocker 31, outwardly of the links 28a, are preferably reduced and each rotatably extends through an opening 30a formed in the adjacent bridge plate 30 above the pivotal connection 28x' of the adjacent link 28 therewith, and outwardly of the bridge plate the reduced end of the rocker 31 to which end is suitably fixed a member 32, preferably consisting of a hub a portion of the side wall of which is provided with gear elements 32' disposed on an arc concentric to the axis of the rocker 31.

The outer ends of the main links 29 are pivotally connected on alined axes 29x near the lower ends of the side bars of a load pusher 33, and their inner ends are pivotally connected at 29x' on the outer sides of the bridge plates 30, the axes of the pivotal connections 28x', 29x', being disposed in a horizontal plane. The outer ends of the links 29a are pivotally mounted at 29a' on the side bars of the pusher 33 above the connections 29x of the links 29 therewith, whereas the inner end portion of each link 29a is formed with a through opening 29' through which extends the adjacent end portion of a rocker 31'. The link 29a is fixed (preferably welded) to the rocker 31'.

As shown in Figs. 6 and 10, the opposite end portions of the rocker 31' are preferably reduced and each rotatably extends through an opening 30a' formed in the adjacent bridge plate 30 above the pivotal connection 28x' of the adjacent link 29 therewith, and outwardly of the bridge plate the reduced end of the rocker 31' is provided with a member 32a preferably consisting of a hub a portion of the side wall of which is provided with gear elements 32a', disposed on an arc concentric to the axis of the rocker 31' and in mesh with the gear elements 32', as shown in Fig. 4, the axes of the rockers 31, 31', being disposed in a horizontal plane. As the members 32, 32a are fixed to the rockers 31, 31', respectively, and the gear elements 32', 32a' are in meshing engagement, rotative movement of the rockers 31, 31' through equal angular distances is insured during operation of the inner and outer pairs of links 28—28a, 29—29a, in either direction. From the foregoing description it will be observed that each of the inner pairs of links 28, 28a and each of the outer pairs of links 29, 29a constitute parallel levers, so that when the inner pairs of links and outer pairs of links are relatively moved, as later set forth, the pusher 33 is moved horizontally, outwardly or inwardly parallel to the members 11, 11', 11, 11'.

It will also be observed that the pivotal connections 28a' for the links 28a and the pivotal connections 29a' for the links 29 are above and offset laterally outwardly with respect to the pivotal connections 28x, 29x, respectively; by reason of such arrangement of pivotal connections the pusher 33a is supported in a vertical position and maintained in such position during movement thereof outwardly or inwardly.

As will later be apparent, the rockers 31, 31', bridge plates 30, a power mechanism 34 and linkages between the latter and the rockers provide articulatable connections between the inner ends of the pairs of links 28—28a, 29—29a, whereby the said pairs of links are relatively movable to and from an expanded position to operate the pusher 33 outwardly, to discharge loads on the members 11, 11', and inwardly into a collapsed relation. The pusher 33 consists of side bars 33a, a top bar 33b and a vertically disposed plate 33c extending between the side bars 33a adjacent their lower ends. Between the bars and the plate I preferably provide spacedly related, connected together and to the bars and plate, horizontally and vertically extending rods 33' (see Fig. 3) forming a wall to engage a load L, as shown in dotted lines in Fig. 4.

The power mechanism 34 consists of a cylinder 34a having therein a reciprocatable piston 34b connected to a rod 34'. The cylinder 34a is provided with connections 34b' adjacent its opposite ends for fluid supply pipes 35, 35a, the supply of fluid pressure through either pipe to the cylinder 34a and discharge of the fluid from the latter through the other pipe being controlled by a valve 34" (Fig. 13), which is operated by a lever 2x'''. The axes of the cylinder 34a is disposed midway of the rockers 31, 31', and is provided below the latter with diametrically related outwardly extending supports 36, 36a, on which are mounted posts 36', 36a', respectively. Connections 36x, 36x' are provided between the posts and the rockers 31, 31'; these connections being similar in construction, reference to one thereof is made (but like parts of the other connections are identified by the same reference characters) as follows: 37 indicates alined spaced knuckles on the upper end of the post 36'. A pivot pin 37' extends through (a) the alined knuckles 37 and the alined knuckles on the inner ends of spaced links 38, the outer ends of which are provided with knuckles 38' pivotally mounted by the pin 37' on spaced pairs of lugs 39, respectively (see Fig. 6), which are fixed to one side of the adjacent rocker 31' (Fig. 6), and (b) the knuckle 40 on the inner end of an intermediate link 40a, the outer end of which is provided with a knuckle 40' pivotally mounted on a pair of lugs 41 fixed to one side of the rocker 31 (Fig. 6); that is, that side corresponding to the side of the rocker 31' to which the lugs 39 are fixed.

42 indicates a plate disposed vertically and parallel to and between the rockers 31, 31', the plate 42 intermediate its ends being connected to the piston rod 34' by devices 34x (later referred to) mounted in a recess 34x' formed in the plate 42. The plate 42 extends laterally to the opposite sides of the cylinder 34a. The opposite end portions of the plate 42 extend downwardly and terminate at each side of the cylinder 34a with alined pairs of knuckles 43—43', 43a—43a' (Figs. 10 and 10a) in which are pivotally mounted the adjacent ends of links 44, respectively. The opposite end of each link 44 is disposed between and pivotally connected to a pair of knuckles 44' provided on the outer end of a link 44a, the inner end of which is fixed to the adjacent rocker, as shown in Fig. 10. As shown in Figs. 10, 11 and 12, the links 44a are fixed to corresponding sides of the rockers 31, 31', but diametrically of the sides to which the lugs 39 are fixed.

From the foregoing description it will be noted (a) that the cylinder 34a is operatively connected through the sets of links 38, lugs 39 and links 40a to the upper sides of the rockers 31, 31', as viewed in Fig. 11, whereas (b) the piston rod 34' is operatively connected through links 44 and links 44a to the lower sides of the rockers 31, 31', as shown in Fig. 11. Accordingly, when fluid pressure is supplied through the pipe 35 to the lower end of the cylinder 34a below the piston 34b the rocker 31 is rotated counter-clockwise and the rocker 31' is rotated clockwise, as viewed in Figs. 8 and 12, whereby the pairs of links 28, 28a swing away from the frame 6' and the pairs of links 29, 29a swing outwardly relative to the pairs of links 28, 28a, as shown in Figs. 4, 6 and 8 to move the member 33 outwardly and to discharge the load L. Likewise, when fluid pressure is supplied through pipe 35a to the upper end of the cylinder 34a above the piston 34b the rocker 31 is rotated clockwise and the rocker 31' is rotated counter-clockwise, whereby the pairs of links 28—28a, 29—29a are retracted to move the pusher 33 inwardly to the position shown in Figs. 1 and 2.

From the foregoing description it will be noted that a single cylinder-piston unit is employed and the applied power thereof to operate the pairs of links 28—28a, 29—29a in either direction is due to the reaction between the piston 34b and one of the heads of the cylinder 34a, dependent upon the direction the pusher 33 is to be moved.

The devices 34x, which connect the piston rod 34' and plate 42 together, consist of upper and lower collars 42x, 42x', respectively, loosely surrounding the piston rod and having inner annular concave surfaces and an intermediate member 42x" the opposite faces of which are of convex shape and complementary to the inner concave surfaces of the collars 42x, 42x'. The opposite outer faces of the collars 42x, 42x' engage the upper and lower walls of the opening 34x'; that is, the marginal portions of these walls which form the openings through which the piston rod 34' extends. As shown, the intermediate member 42x" is screw threaded on the piston rod 34' for adjustment endwise of the latter whereby the relation of piston rod to the plate 42 may be changed, the effect of which is to insure operation of the rockers in either direction a predetermined distance to completely retract the pairs of links or move the load discharge device 33 outwardly to a predetermined position when discharging a load from the members 11, 11'. The spherical surfaces of the members 42x, 42x' and 42x" serve to maintain the knuckles 43—43', 43a—43a', links 44 and links 44a in alinement to insure free operation thereof. The side walls of the member 42x" are formed with recesses, whereby a spanner or the like may be employed to rotate it.

45, 45 indicate auxiliary connections between the rockers 31, 31' at opposite sides of the cylinder 34a. These connections serve to prevent flexing of the rockers 31, 31' intermediate their opposite ends to maintain them in parallel relation, whereby danger of the connections between the cylinder 34a and rockers 31, 31', and between the piston rod 34' and the rockers 31, 31', becoming disalined during or resulting from repeated operations of the links 28—28a and 29—29a is avoided. Each connection 45 consists of (a) a pair of arcuate members 45a the inner side walls of which have a curvature corresponding to that of rockers 31, 31', and are suitably fixed (preferably welded) to and movable with the latter, respectively, and (b) fixedly related members 46 disposed upon opposite sides of the arcuate members 45a and having interlocking relation therewith to connect the rockers 31, 31' together without affecting the relative rotative movements of the latter, as already set forth. The members 46 are similar in construction, their opposite end portions being formed with alined through openings 47 through which extend bolts 48 (the bolt heads and nuts being preferably countersunk) to clamp the members 46 together. The opposite faces of each member 45a are provided with inner and outer spaced curvilinear walls 45x, 45x' concentrically related to the axis of the adjacent rocker and forming between them, from end to end of the member 45a, arcuate recesses or guide-ways 45'. The opposite side walls 46' of the members 46 are of arcuate shape, concentric to the axes of the rockers 31, 31', and provided on their opposed faces adjacent to the side walls 46' with inwardly extending, alined walls 46a (which are also concentric with the axes of the rockers 31, 31') which extend into the guideways 45' and serve as guides for the members 45a. The opposed faces of the members 46, between and spaced from the terminating end portions of the walls 46a provide pads 46b, which are in engagement when the members are secured together by the bolts 48. The pads 46b are disposed in planes inwardly of the top surfaces of the walls 46a and walls 45x, 45x', whereby the arcuate members 45a are free to oscillate with the rockers 31, 31'. As shown, the opposite side walls of the pads 46b are curvilinearly shaped concentric to the axes of the rockers 31, 31', and cooperate with the walls 46a to provide guides for the outer curvilinear walls of the members 45a.

From the foregoing description it will be observed that as the arcuate members 45a are fixed to the rockers 31, 31', and move therewith relative to each other and are provided with arcuate walls in slidable interlocking relation with arcuate walls on the opposed faces of the members 46, the intermediate portions of the rockers 31, 31' are connected together to prevent flexing thereof due to the operations of the pairs of links 28—28a, 29—29a.

By reason of the fact that the carrier 3' is moved upwardly and downwardly and the cylinders 19a, 34a are mounted on the carrier, the outer sections 23', 23a' of the respective fluid flow pipes 23, 23a, which are connected to cylinder 19a, and the outer sections 35', 35a' of the respective fluid flow pipes 35, 35a, which are connected to the cylinder 34a, consist of flexible hose, which reeve on separate pairs of pulleys, respectively, carried by the cross-head 13 for movement therewith. As already set forth, the pair of pulleys 15 are mounted on the shafts 13b and hose 23', 23a' reeve thereon as shown in Figs. 7, 8, 9 and 13. 47, 47 indicate angles the upper ends of which are provided with offsets 47' suitably secured to the lower side of the cross-head 13 (Figs. 8 and 9) and depend downwardly from the latter at opposite sides of the cylinder 9. The lower ends of the angles 47, 47 are provided with laterally disposed walls 47a, each formed with an opening 47b through which the adjacent rod 16 loosely extends to provide a guide for the adjacent angle 47 as the latter moves upwardly and downwardly with the cross-head 13. As shown in Figs. 6, 7 and 9, the side walls of the angles 47 are provided with outwardly extending, alined stud shafts 49 on which pulleys 15a are rotatably mounted, the pair of pulleys 15a providing reeving elements for the hose sections 35', 35a', as shown in Figs. 6, 9 and 13. The inner ends of the hose 23', 23a', 35', 35a' are detachably connected to the adjacent ends of the pipes 23, 23a, 35, 35a by suitable fittings 50, respectively, which may be secured in any desired manner to the guides 2 or on the inner side of a cross plate 50a secured thereto.

Figs. 14, 15 and 16 show a modified form of construction wherein the pulleys about which the flexible hose sections 23', 23a', 35', 35a' reeve are mounted on one side of the cylinder 9. In these views the shaft 13x for the sprocket 13d, about which the adjacent chain 13d reeves, is extended and two pulleys 51, 51a are mounted thereon to provide reeving devices for the hose sections 23', 23a' connected to the cylinder 19a; also, the lower end portion of the channel 52, which is secured to and depends from the cross-head 53, is provided with a shaft 52a on which are mounted pulleys 54, 54a, to provide reeving devices for the hose sections 35', 35a', which extend upwardly and are suitably connected by fittings to the pipes 35, 35a.

To those skilled in the art to which my invention relates, many changes in construction and widely differing embodiments and applications thereof will be apparent without departing from the spirit of the invention. My disclosures and the description herein are purely illustrative and not intended to be in any sense limiting.

Fig. 13 shows schematically the system for supplying the fluid under pressure to the valves and discharge of the fluid from the cylinders to and through the valves to the sump S, which system includes a driven pump P, the intake of which is connected with the sump S by a pipe P'. The outtake of the pump P is connected by a pipe P'' with the valves 2', 14a, 22' and 34'', which may be associated as a unitary structure in a well known manner.

What I claim is:

1. In an industrial truck, a chassis, an elevating assembly mounted on said chassis and including spaced upright guide members and cylinder means intermediate said guide members, said cylinder means having an element fixed with respect to said chassis and a movable element, a load carriage comprising a frame supported for elevational movement on said guide members, a cross-head carried by said movable element, flexible means reeved over said cross-head and interconnecting said cross-head and said carriage for raising and lowering said carriage upon operation of said cylinder means, a pair of fork members, means supporting said fork members on said frame in spaced relationship for relative movement toward and away from each other, fluid pressure actuated means on said carriage operatively connected to said fork members for relatively moving the latter, flexible conduits extending between said chassis and said fluid pressure actuated means, a pusher member for discharging loads from said fork members, parallel motion mechanism connecting said pusher member to said frame and supporting said pusher member for movement along said fork members while in a position substantially perpendicular thereto, power actuated means operatively connected to said parallel motion mechanism for moving said pusher member outwardly along said fork members to discharge a load and inwardly along said fork members to a retracted position adjacent the inner end of said fork members, said power actuated means including a fluid pressure cylinder, a flexible condiut extending between said chassis and said cylinder for supplying fluid pressure to said fluid pressure cylinder, and reeving means comprising vertically spaced reeving elements carried by said cross-head for guiding said conduits between said chassis and said load carriage, each of said reeving elements guiding a different one of said flexible conduits, and a member dependingly supporting one of said reeving elements from said cross-head.

2. In an industrial truck, an elevatable load carriage comprising a frame, load-supporting means extending outwardly from said frame; a load-discharging member, and means supporting said load-discharging member for movement along said load-supporting means between an inner position adjacent the inner end of said load-supporting means and a position adjacent the outer end of said load-supporting means comprising spaced first and second inner pairs of parallel links, means pivotally supporting the inner ends of the links of said pairs to said frame with the pivot of each link of the first pair being aligned with the pivot of the corresponding link of the second pair, spaced first and second outer pairs of links having the outer ends of the links of each pair pivotally connected to said member with the pivots of the corresponding links of each of the outer pairs of links being aligned, a first member fixedly connecting the outer ends of two corresponding links of said first and second inner pairs of links, a second member extending between and fixedly connecting the inner ends of two corresponding links of said first and second outer pairs of links, said first and second members each having diametrically opposed levers extending from opposite sides thereof; a fluid pressure actuator having a cylinder element and a piston element; links pivotally connected to said piston element and respectively to said levers extending from one side of said first and second members and links pivotally connected to said cylinder element and respectively to the levers extending from the opposite sides of said members, first and second bridging plates interconnecting the outer ends respectively of said first and second members, said first and second members being rotatable relative to said bridging plates, and means pivotally connecting the links of said pairs of parallel links not joined by said first and second members to said bridging plates.

3. In an industrial truck, an elevatable load carriage comprising a frame; load-supporting means extending outwardly from said frame; a load-discharging member; means supporting said load-discharging member for movement along said load-supporting means between an inner position adjacent the inner end of said load-supporting means and a position adjacent the outer end of said load-supporting means comprising spaced first and second inner pairs of parallel links, means pivotally supporting the inner ends of the links of said pairs to said frame with the pivot of each link of the first pair being aligned with the pivot of the corresponding link of the second pair, spaced first and second outer pairs of links having the outer ends of the links of each pair pivotally connected to said member with the pivots of the corresponding links of each of the outer pairs of links being aligned, a first member fixedly connecting the outer ends of two corresponding links of said first and second inner pairs of links, a second member extending between and fixedly connecting the inner ends of two corresponding links of said first and second outer pairs of links, said first and second members each having diametrically opposed levers extending from opposite sides thereof; a fluid pressure actuator having a cylinder element and a piston element; links pivotally connected to said piston element and respectively to said levers extending from one side of said first and second members and links pivotally connected to said cylinder element and respectively to the levers extending from the opposite sides of said members; first and second bridging plates interconnecting the respective outer ends of said first and second members, said first and second members being rotatable relative to said bridging plates; means pivotally connecting the links of said pairs of parallel links not joined by said first and second transverse members to said bridging plates, and gear elements fixed respectively to the outer ends of said first and second members and meshing respectively with the gearing element on the corresponding end of the other of said first and second members.

4. In an industrial truck, an elevatable load carriage comprising a frame, load-supporting means extending outwardly from said frame; a load-discharging member, and means supporting said load-discharging member for movement along said load-supporting means between an inner position adjacent the inner end of said load-supporting means and a position adjacent the outer end of said load-supporting means comprising spaced first and second inner pairs of parallel links, means pivotally supporting the inner ends of the links of said pairs to said frame with the pivot of each link of the first pair being aligned with the pivot of the corresponding link of the second pair, spaced first and second outer pairs of links having the outer ends of the links of each pair pivotally connected to said member with the pivots of the corresponding links of each of the outer pairs of links being aligned, a first member fixedly connecting the outer ends of two corresponding links of said first and second inner pairs of links, a second member extending between and fixedly connecting the inner ends of two corresponding links of said first and second outer pairs of links, said first and second members each having diametrically opposed levers extending from opposite sides thereof; a fluid pressure actuator having a cylinder element and a piston element; links pivotally connected to said piston element and respectively to said levers extending from one side of said first and second members and links pivotally connected to said cylinder element and respectively to the levers extending from the opposite sides of said members; first and second bridging plates interconnecting the respective outer ends of said first and second members, said first and second members being rotatable relative to said bridging plates, means pivotally connecting the links of said pairs of parallel links not joined by said first and second transverse members to said bridging plates, gear elements fixed respectively to the outer ends of said first and second members and each meshing with the gearing element on the corresponding outer end of the other of said first and second members, and support means intermediate the ends of said first and second members interconnecting the first and second members and permitting relative rotation between the first and second members and the support means.

5. An industrial truck, a chassis, spaced upright guide members mounted on said chassis, a load carriage supported for elevational movement by said spaced upright guide members, fluid pressure operated cylinder means intermediate said spaced upright guide members having a movable element, a cross-head carried by said movable element, flexible elements interconnecting said cross-head and said carriage for raising and lowering said carriage upon the operation of said cylinder means, a plurality of double acting hydraulically operated motors on said load carriage, a pair of flexible conduits for each of said hydraulically operated motors extending from said chassis to said motors, first reeving elements for guiding a plurality of said conduits from said chassis to said load carriage, means mounting said first reeving elements on said cross-head, second reeving elements vertically spaced from said first reeving elements for guiding another plurality of said conduits from said chassis to said carriage, and support means depending from said cross-head and supporting said second reeving elements in fixed relation to said first reeving elements whereby said reeving elements are movable as a unit.

6. In an industrial truck, a chassis, spaced upright guide members mounted on said chassis, a load carriage supported for elevational movement by said spaced upright guide members, fluid pressure operated cylinder means intermediate said spaced upright guide members and including a movable element, a cross-head carried by said movable element, flexible elements interconnecting said cross-head and said carriage for raising and lowering said carriage upon operation of said cylinder means, a plurality of double acting motors on said carriage, a pair of flexible conduits for each of said motors extending from said chassis to said motors, first reeving elements for guiding a plurality of said conduits from said chassis to said load carriage, means mounting said first reeving elements on said cross-head and positioning the first elements above said carriage, second reeving elements vertically spaced from said first reeving elements for guiding another plurality of said conduits from said chassis to said carriage, and support means depending from said cross-head and supporting said second reeving elements in fixed relation to said first reeving elements and positioning said second reeving elements below said motors when said carriage is in its lowermost position.

References Cited in the file of this patent

UNITED STATES PATENTS

| | | |
|---|---|---|
| 1,332,227 | Norman | Mar. 2, 1920 |
| 2,360,407 | Dunham et al. | Oct. 17, 1944 |
| 2,432,411 | Guerin et al. | Dec. 9, 1947 |
| 2,536,068 | Lehmann | Jan. 2, 1951 |
| 2,574,045 | Lapham | Nov. 6, 1951 |
| 2,611,498 | Broersma | Sept. 23, 1952 |
| 2,613,830 | Ponnequin | Oct. 14, 1952 |
| 2,619,241 | Jessen | Nov. 25, 1952 |
| 2,639,051 | Thomas | May 19, 1953 |
| 2,645,372 | Broersma | July 14, 1953 |
| 2,647,650 | Sherriff | Aug. 4, 1953 |
| 2,672,249 | Ulinski | Mar. 16, 1954 |